United States Patent Office.

HENRY LASSING, OF NEW YORK, N. Y.

Letters Patent No. 99,094, dated January 25, 1870.

IMPROVED MODE OF PREPARING SEED FOR PLANTING.

The Schedule referred to in these Letters Patent and making part of the same.

*To all whom it may concern:*

Be it known that I, HENRY LASSING, of the city, county, and State of New York, have invented a new and improved Mode of Preparing Seed for Planting; and I do hereby declare that the following is a full, clear, and exact description thereof, which will enable others skilled in the art to make and use the same.

This invention relates to a new and useful improvement in preparing and protecting seed for planting, whereby the seeds of all kinds of cereals, as well as potatoes and other similar roots and bulbs, are protected from vermin, and fertilized after planting; and The invention consists in covering such seeds with a fertilizing-compound, composed in part of glutinous substances, for making the compound adhere to the seeds, the same being applied as hereinafter more fully described.

In carrying out my invention and discovery, I make use of the following ingredients for forming the adhesive composition, but do not wish to confine myself exclusively thereto, except as it regards the glutinous portion, as all seeds do not require the same treatment.

In forming the coating or composition, I use one-third part, in bulk, of guano; one-sixth part, in bulk, Indian meal; three-twelfths part, in bulk, powdered charcoal; one-sixth part, in bulk, of starch.

These articles are mixed together and heated to a temperature not to exceed 100° Fahrenheit.

A portion of the compound is then made into a thin paste, which may be slightly acidulated.

The seeds are then immersed in the paste, and stirred so that each seed shall be covered with a good coating thereof. Seeds are then rolled or stirred in the dry composition until each seed is thoroughly covered, and presents a dry surface, and without any tendency in them to adhere together.

By this method, the seeds are protected from worms and insects, and made to germinate much sooner than when planted in their ordinary or natural condition.

The coating is an active fertilizer, attracting moisture, furnishing nitrogen, ammonia, carbonic acid, and all the nutriment required to form a vigorous plant.

Having thus described my invention,

I claim as new, and desire to secure by Letters Patent—

Covering seeds with a glutinous compound, composed substantially as described, and in the manner set forth.

HENRY LASSING.

Witnesses:
 GEO. W. MABEE,
 ALEX. F. ROBERTS.